(No Model.)

A. BALL.
DRILL COLUMN.

No. 568,471. Patented Sept. 29, 1896.

WITNESSES:
Robert C. Totten
Walter Tamarisa

INVENTOR
Albert Ball
By Kay & Totten
ATTORNEYS

UNITED STATES PATENT OFFICE.

ALBERT BALL, OF CLAREMONT, NEW HAMPSHIRE, ASSIGNOR TO THE SULLIVAN MACHINERY COMPANY, OF SAME PLACE AND CHICAGO, ILLINOIS.

DRILL-COLUMN.

SPECIFICATION forming part of Letters Patent No. 568,471, dated September 29, 1896.

Application filed January 30, 1896. Serial No. 577,362. (No model.)

*To all whom it may concern:*

Be it known that I, ALBERT BALL, a resident of Claremont, in the county of Sullivan and State of New Hampshire, have invented a new and useful Improvement in Drill-Columns; and I do hereby declare the following to be a full, clear, and exact description thereof.

My invention relates to columns or posts for supporting rock or other drills.

The invention comprises certain details of construction, all of which will be fully hereinafter set forth and claimed.

To enable others skilled in the art to make and use my invention, I will describe the same more fully, referring to the accompanying drawings, in which—

Figure 1:
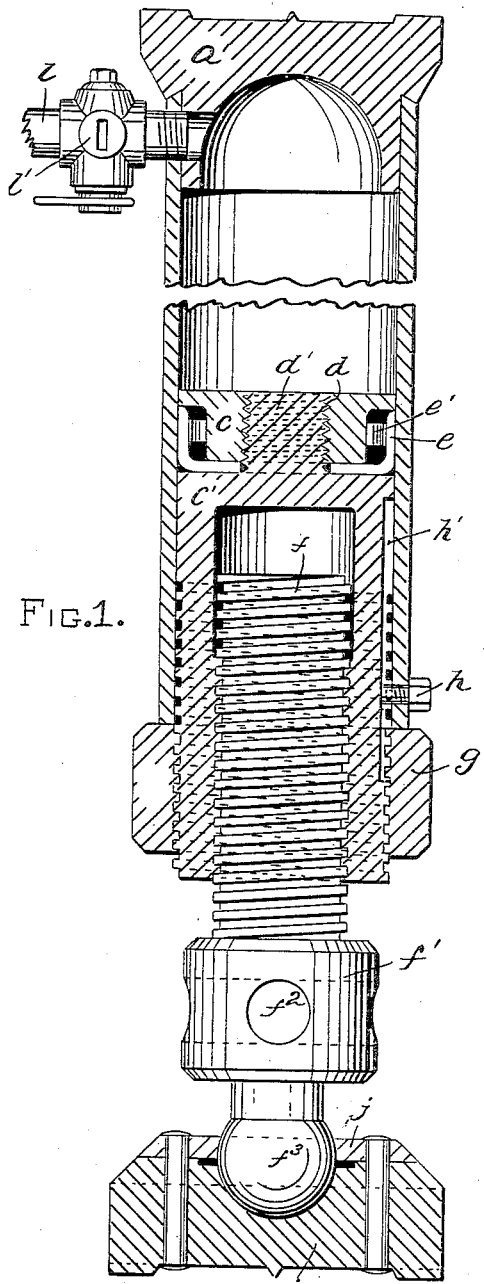
Figure 2:
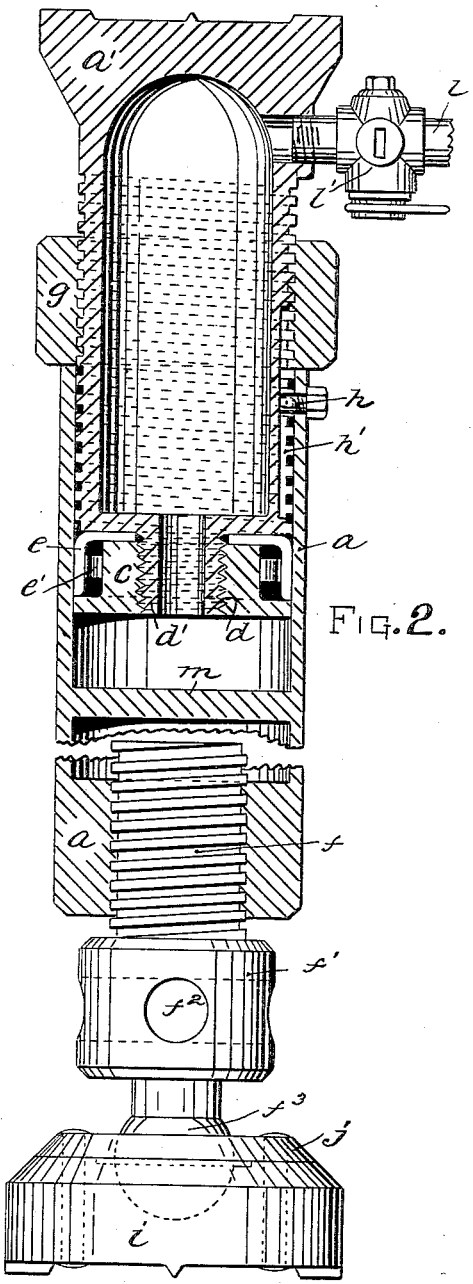

Figure 1 is a sectional elevation of my improved column, and Fig. 2 is a modified form thereof.

The main portion of the column consists of the hollow body portion $a$, which has at the upper end thereof the head $a'$. Within the hollow body portion $a$ is the piston, said piston consisting of the head $c$ and the extension $c'$. This extension is threaded externally and internally. The head $c$ of the piston has a threaded opening $d$ therein, with which a threaded neck $d'$ on the extension $c'$ engages. The leather or other packing $e$ is inserted between the head and extension, and serves to make a tight joint to prevent the air passing by the piston-head. The spring $e'$ is interposed between the head $c$ and the packing to force said packing against the inner wall of the hollow body portion.

The threaded bar $f$ engages with the internal threads of the extension $c'$, while the nut $g$ engages the external threads of said extension. In order to prevent the turning of the piston, a screw $h$ passes through the hollow body portion $a$ into a longitudinal groove $h'$ in the extension $c'$ of said piston.

The threaded bar $f$ has a ring or enlargement $f'$ thereon, with an opening $f^2$ therein to receive a bar for turning said threaded bar. At the end of said threaded bar $f$ is the spherical head $f^3$, which fits within a correspondingly-shaped recess formed in the foot-block $i$. A locking-plate $j$ is bolted down to the block $i$ to retain said spherical head $f^3$ in its recess. In this manner the foot-block $i$ can conform to the blocking.

The compressed air, steam, or other force employed to extend the column is admitted by the pipe $l$, controlled by a suitable valve $l'$. This valve is preferably a two-way valve, so that the air can be discharged readily from the column should the blocking prove to have been wrongly situated and it should be desired to change the position of the column.

In Fig. 2 I have shown a modified form of my invention in which the piston carries the head $a'$ to be forced into the blocking, and in which the air is admitted to the hollow space in said piston. The nut $g$ engages the extension $c'$ of the piston, as before, but in this case its position is reversed and it bears against the top instead of against the lower end of the hollow body portion.

The threaded bar $f$ engages with a threaded opening in the body portion $a$, and in order to prevent the air from escaping down around the said bar $f$ a partition $m$ is formed in said body portion, whereby all possibility of leakage around the threaded bar is removed. The hollow space in the piston communicates with the hollow body portion by means of the passage $n$.

When it is desired to adjust my improved column, constructed in accordance with Fig. 1, in position, the blocking, usually a block of wood, is placed beneath the foot-block $i$ on the floor of the mine, while the blocking is held up against the roof of the mine above the top head $a'$. The compressed air is admitted by the pipe $l$, whereupon the column will be extended until the head $a'$ is forced into contact with the blocking. While the compressed air holds the column in its extended position the nut $g$ is turned until it is brought into contact with the lower end of the hollow body portion, whereupon the air may be discharged and the nut $g$ will hold said column in its extended position. The threaded bar $f$ may also be turned to aid in strengthening the position of the column. In the same manner when it is desired to lower the column the operator turns on the compressed air, which holds the column in position until he lowers the nut the required amount, whereupon by discharging the air the body portion descends.

The operation of the form illustrated in Fig. 2 is practically the same. The air is admitted into the piston and passes through the opening $n'$ into the hollow body portion, whereupon the piston is forced up with the head $a'$ in contact with the blocking. The nut $g$ is lowered until it comes in contact with the upper end of the body portion and holds the column in its extended position without the aid of the compressed air.

My improved column may be used in a horizontal position, if desired.

What I claim as my invention, and desire to secure by Letters Patent, is—

1. In a column for supporting drills, a hollow body portion, a threaded piston within said hollow body portion, a threaded bar supporting said hollow portion and piston, a nut engaging said piston adapted to hold the column in its extended position, and means for supplying compressed air to raise said column, substantially as set forth.

2. In a column for supporting drills, a hollow body portion, a threaded piston within said hollow body portion, a threaded bar engaging said piston, a nut engaging said piston, and means for supplying compressed air to said hollow body portion to raise same, substantially as set forth.

3. In a column for supporting drills, a hollow body portion, a cup-piston within said hollow body portion, said piston being internally and externally threaded, a threaded bar engaging the interior of said piston, a nut engaging the exterior of said piston, and means for supplying compressed air to said hollow body portion to raise same, substantially as set forth.

In testimony whereof I, the said ALBERT BALL, have hereunto set my hand.

ALBERT BALL.

Witnesses:
H. W. PARKER,
E. J. TENNEY.